United States Patent
Li et al.

(10) Patent No.: US 9,945,667 B2
(45) Date of Patent: Apr. 17, 2018

(54) SENSING SYSTEM AND SENSING METHOD USING THE SAME

(71) Applicant: National Applied Research Laboratories, Taipei (TW)

(72) Inventors: Lu-Sheng Li, Taipei (TW); Kuo-Chun Chang, Taipei (TW); Fang-Yao Yeh, Taipei (TW); Ting-Yuan Huang, Taipei (TW)

(73) Assignee: National Applied Research Laboratories, Taipei (TW)

( * ) Notice: Subject to any disclaimer, the term of this patent is extended or adjusted under 35 U.S.C. 154(b) by 171 days.

(21) Appl. No.: 15/186,881

(22) Filed: Jun. 20, 2016

(65) Prior Publication Data
US 2017/0322024 A1    Nov. 9, 2017

(30) Foreign Application Priority Data

May 6, 2016 (TW) .............................. 105114060 A

(51) Int. Cl.
*G01C 9/06* (2006.01)
*G01C 9/20* (2006.01)
*G01D 5/353* (2006.01)

(52) U.S. Cl.
CPC ................ *G01C 9/06* (2013.01); *G01C 9/20* (2013.01); *G01D 5/353* (2013.01); *G01C 2009/066* (2013.01)

(58) Field of Classification Search
CPC ....... G01C 9/06; G01C 9/20; G01C 2009/066
USPC .................................. 33/1 HH, 333, 366.17
See application file for complete search history.

(56) References Cited

U.S. PATENT DOCUMENTS

| | | | | | |
|---|---|---|---|---|---|
| 2,532,883 | A | * | 12/1950 | Bennett | G01C 9/22 324/661 |
| 2,722,056 | A | * | 11/1955 | Stimler | G01C 9/18 33/366.17 |
| 2,804,692 | A | * | 9/1957 | Karstens | G01C 9/18 200/56 R |
| 3,817,625 | A | * | 6/1974 | Jordan | G01C 9/22 250/231.1 |

(Continued)

FOREIGN PATENT DOCUMENTS

| | | | | |
|---|---|---|---|---|
| GB | 2195775 A | * | 4/1988 | ............... G01C 9/06 |
| JP | 1990081412 U | | 5/1988 | |

(Continued)

*Primary Examiner* — Christopher Fulton
(74) *Attorney, Agent, or Firm* — Muncy, Geissler, Olds & Lowe, P.C.

(57) ABSTRACT

The present invention relates to a sensing system and a sensing method using the same. The sensing system includes at least one tested unit and an optical fiber measuring unit. The tested unit includes a container, a strain arm and a float. The container can be filled with a fluid, and the strain arm is connected with the float and combined with a measuring portion of the optical fiber measuring unit. When the container is disposed on a body of interest, the surface inclination or settlement of the body of interest would cause changes of buoyant force on the floating element and induce bending deformation of the strain arm. Accordingly, the surface deformation of the body of interest can be determined by detecting the bending deformation of the strain arm using the measuring portion combined with the strain arm.

13 Claims, 6 Drawing Sheets

(56) References Cited

U.S. PATENT DOCUMENTS

| | | | | |
|---|---|---|---|---|
| 4,087,920 A * | 5/1978 | Huggett | ............... | G01C 5/04 |
| | | | | 33/367 |
| 4,464,419 A * | 8/1984 | Horn | ............... | G01L 1/2287 |
| | | | | 174/565 |
| 4,794,704 A * | 1/1989 | Calcagni | ............... | G01C 5/04 |
| | | | | 33/367 |
| 4,848,003 A * | 7/1989 | Westphal | ............... | G01C 9/06 |
| | | | | 33/1 H |
| 5,279,040 A * | 1/1994 | Kippelt | ............... | G01C 9/06 |
| | | | | 33/366.13 |
| 5,428,902 A * | 7/1995 | Cheah | ............... | G01C 9/20 |
| | | | | 324/707 |
| 5,992,032 A * | 11/1999 | Chiang | ............... | G01C 9/06 |
| | | | | 33/365 |
| 7,937,847 B1 * | 5/2011 | Karapetyan | ............... | G01C 9/20 |
| | | | | 33/351 |
| 2002/0050578 A1 | 5/2002 | Yashiro et al. | | |
| 2014/0002275 A1 | 1/2014 | Lee | | |
| 2015/0346018 A1 * | 12/2015 | M | ............... | G01F 23/38 |
| | | | | 73/314 |

FOREIGN PATENT DOCUMENTS

| | | | |
|---|---|---|---|
| JP | 2002022492 A | 1/2002 | |
| JP | 2004-212247 A | 7/2004 | |
| JP | 2014-10148 A | 1/2014 | |
| TW | M464474 U | 11/2013 | |

\* cited by examiner

SENSING SYSTEM AND SENSING METHOD USING THE SAME

CROSS REFERENCE TO RELATED APPLICATION

This application claims the benefits of the Taiwan Patent Application Serial Number 105114060, filed on May 6, 2016, the subject matter of which is incorporated herein by reference.

BACKGROUND OF THE INVENTION

1. Field of the Invention

The present invention relates to a sensing system and a sensing method using the same, particularly, to a sensing system and a sensing method using the same for detecting inclination or settlement of a body of interest.

2. Description of Related Art

In recent years, natural disasters took place in many countries, which not only threaten people's life and properties but also may affect the country's economy. Therefore, to instantly monitor the conditions about the environment and buildings and early warning become important issues to reduce the impact caused by disasters. Particularly, monitoring the conditions of environment and buildings before the disaster is helpful to take appropriate emergency measures immediately and to reduce life and property damages caused by disasters, it can also serve as the basis for post-disaster reconstruction to accelerate post-disaster reconstruction.

In the past, the measurements of the environment or the buildings were made once in a specific period of time to understand their safety conditions. However, the instantaneous condition of the environment or the buildings or their daily changes cannot be predominated because they are not monitored continuously, therefore, reinforcements or maintenance cannot be made appropriately or to provide early warnings before disasters. Nowadays, several sensing devices for safety monitoring have been developed for predominating the safety of the environment and the buildings.

However, most of the sensing devices for safety monitoring are disadvantageous of complicated, difficult construction, high cost, difficult to maintain, short service life, or electromagnetic interference, thus, those sensing devices have not been widely applied.

SUMMARY OF THE INVENTION

One Object of the present invention is to provide a sensing system, which is advantageous of simple structure, lower cost, easy construction, easy maintenance, long service life, and free of electromagnetic interference. The sensing system may be applied for monitoring the inclination or settlement of the environment or structures (such as buildings, bridges, roads) to instantly ensure the safety of the environment and the structures.

In order to achieve the aforementioned object, the present invention provides a sensing system, which comprises at least one tested unit including a container, a strain arm, and a float, wherein an accommodating space is defined in the container for accommodating a fluid; the strain arm has a fixed end and a free end, wherein the fixed end of the stain arm connects to a side wall of the container, and the free end of the strain arm overhangs in the accommodating space and connects to the float, the float shifts by the changes of buoyant force and induce bending deformation of the strain arm; and an optical fiber measuring unit having at least one measuring portion, wherein the measuring portion combines with the strain arm and extends between the fixed end and the free end for detecting the bending deformation of the strain arm. The sensing system of the present invention may include single or plural tested unit as needed. In the case of plural tested unit included in the sensing system, the sensing system may further include a connecting tube for connecting the accommodating spaces of the containers, so that the liquid levels of the fluid in the accommodating spaces maintained at a same level based on connected pipes principle.

Furthermore, the present invention also provides a sensing method using the aforementioned sensing system; the sensing method comprises the steps of: disposing the container on a body of interest, and a fluid is accommodated in the accommodating space of the container; driving the optical fiber measuring unit to provide an input signal to the measuring portion, and the measuring portion generates an output signal after the input signal is processed, when the surface of the body of interest inclines or sinks, the buoyant force applied to the float may change, and then changes the output signal; and analyzing the output signal to obtain the physical parameters relevant to surface inclination or settlement of the body of interest. Hereinafter, the container is preferably disposed horizontally on the body of interest, and the buoyant force provided by the fluid equals to the weight of the float, so that the stain arm may exhibit a horizontally unbent initial state, and a measured value corresponds to the initial state serves as an initial point for evaluating whether inclination or settlement of the body of interest occurs.

The horizontally of the container or the relative position between the containers will affect the volume of the float that immersed in the fluid the float, and the float shifted by the change of buoyant force may induce the bending deformation of the strain arm. Therefore, when the container is installed on a surface of interest (such as grounds, bridges, buildings, or roads), structural changes such as inclination or settlement may be detected based on the bending deformation of the strain arm in the longitudinal direction. For example, a single container is disposed on a surface of interest when the surface of interest inclines or partially collapse, the container will incline along the surface of interest and move to the inclined direction for maintaining the liquid horizontally and further causes the buoyant force change of the float which deforms the strain arm. Accordingly, the bending deformation level of the strain arm relates to the incline angle of the container, so that the condition of the surface of interest may be known by the bending deformation level between the free end and fixed end of the strain atm. Alternatively, a plurality of containers may be disposed on the surface of interest and these containers are connected to each other by a connecting tube for forming a connected pipes system. When the surface of interest disposed with the container relatively displaced in the vertical direction, the surface level between the containers may differ due to the relevant displacement in the vertical direction. Therefore, the fluid may flow toward the container at a lower position based on the connected pipe principle until the liquid level in each container becomes the same. The buoyant force applied on the container at the lower position becomes larger so that the strain arm bends upwardly, at the meantime; the buoyant force applied on the container at the higher position becomes smaller so that the strain arm bends downwardly. Since the bending deformation level of the strain arm is related to the relevant displacement between the containers, the surface deformation condition of the body of interest may be monitored according to the deformation of the strain arm.

In the present invention, the number of the tested units is not particularly limited and can be determined as needed. For example, if the sensing system of the present invention is applied to bridge safety monitoring system, the number of the tested unit may be determined based on the number of bridge piers for disposing one tested unit on each bridge pier.

In the present invention, the optical fiber measuring unit may comprise an optical fiber, an optical module, and a signal processing module; wherein the measuring portion is disposed on a portion of the optical fiber where corresponds to the strain arm; the optical module is utilized to transmit an input signal to the optical fiber, and the measuring portion generates an output signal, which is transmitted to the optical module, and the signal processing module is utilized to obtain a physical parameter by analyzing the output signal. The optical fiber measuring unit may be a grating, when the strain arm deforms, the measuring portion connected to the strain arm may also deform following the strain arm and induce changes in a grid line spacing of the grating. Accordingly, the deformation condition of the strain arm may be realized through the signal change caused by changes of the grid line spacing of the grating, and the physical parameters related to inclination or settlement may be obtained based on the bending deformation level of the strain arm.

In the present invention, a horizontal reference line is marked on the container, the stain arm remains unbent when the liquid level of the fluid aligns to the horizontal reference line. Accordingly, a value measured for the unbent strain arm serves as an initial point representing the condition without inclination/settlement, the horizontal reference line may serve as a reference line of the initial state. The horizontally unbent initial state may be ensured by maintaining the liquid surface of the fluid in the container aligned to the horizontal reference line.

In the present invention, when the inclination or settlement may be detected by the inclining angle of the container, the fluid is preferably accommodated in a sealed container for preventing evaporation because the signal may change when the liquid surface drops due to evaporation. For example, the tested unit further comprises a water vapor adsorption plate for cap sealing the container and adsorbing saturating amount of water to reduce the evaporation.

In the present invention, the tested unit may further comprise an adjustable platform for disposing the container thereon and adjusting a horizontally of the body of interest when the container is disposed on the body of interest. Accordingly, when the surface of the body of interest is uneven, the adjustable platform may be used to adjust the horizontally of the container to prevent the failure of disposing the container on the body of interest due to the uneven surface. Here, the adjustable platform further comprises a defining structure for defining a disposing region, so that the container may be fixed at the disposing region when the container is disposed on the adjustable platform.

In the present invention, the signal processing module may transmit the obtained physical parameters to a receiving terminal through the wireless or wired transmission. Also, for achieving the warning function, the signal processing module may further generate a warning message, such as SMS, email, or voice message, to the receiving end for informing the control engineer when the physical parameter exceeds the preset limit.

DETAILED DESCRIPTION OF THE PREFERRED EMBODIMENT

Hereafter, examples will be provided to illustrate the embodiments of the present invention. Advantages and effects of the invention will become more apparent from the disclosure of the present invention. It should be noted that these accompanying figures are simplified and illustrative. The quantity, shape and size of components shown in the figures may be modified according to practical conditions, and the arrangement of components may be more complex. Other various aspects also may be practiced or applied in the invention, and various modifications and variations can be made without departing from the spirit of the invention based on various concepts and applications.

Figure 1:
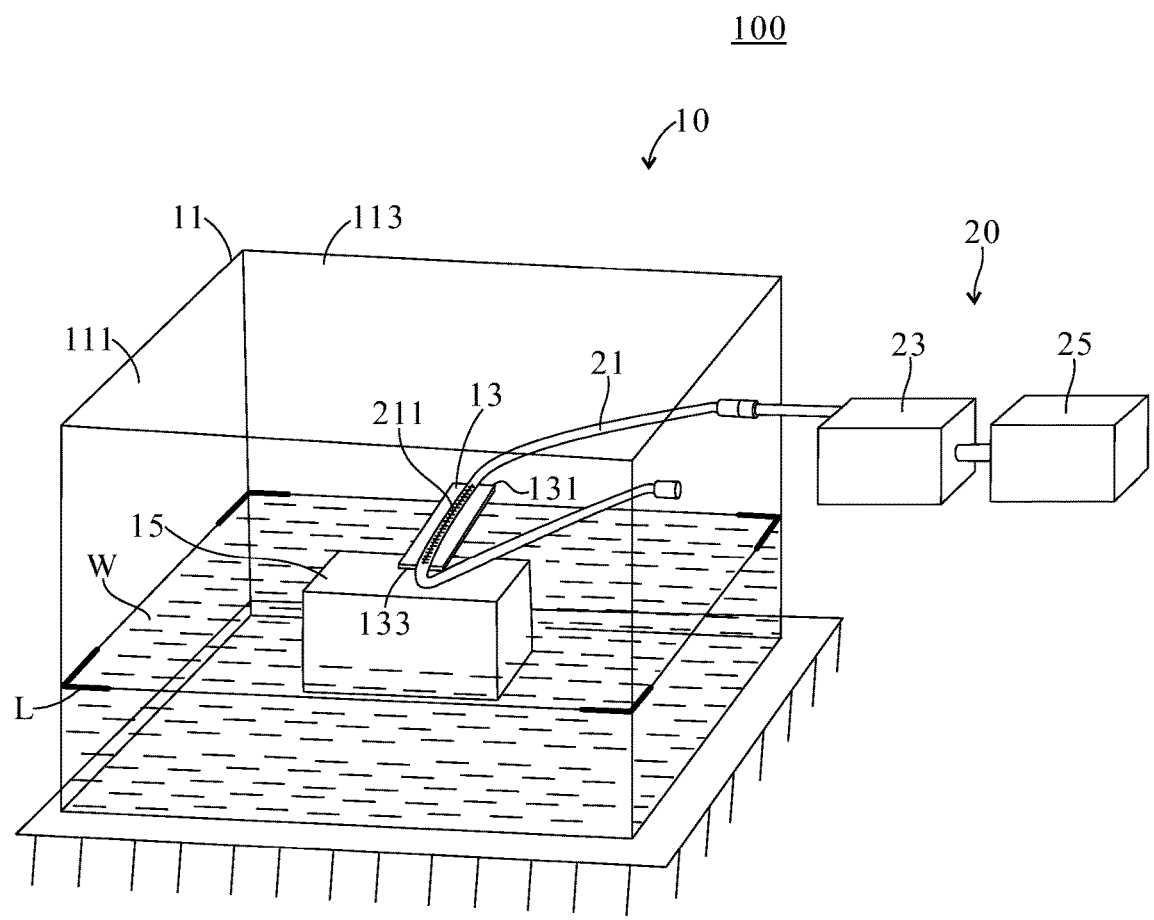
FIG. 1 is a perspective view of the sensing system of one embodiment of the present invention.

Please refer to FIG. 1, which shows a perspective view of the sensing system 100 of one embodiment of the present invention. As illustrated in FIG. 1, the sensing system 100 of the present invention comprises a tested unit 10 and an optical fiber measuring unit 20, wherein the tested unit 10 includes a container 11, a strain arm 13, and a float 15, wherein the optical fiber measuring unit 20 comprises an optical fiber 21, an optical module 23 and a signal processing module 25.

An accommodating space 111 is defined in the container 11 for accommodating a fluid W. The strain arm 13 laterally extends to the accommodating space 111 from a sidewall 113 of the container 11, two ends of the strain arm 13 in the longitudinal direction are a fixed end 131 and a free end 133 respectively, wherein the fixed end 131 is fixed to the sidewall 113 of the container 11 while the free end 133 overhangs in the accommodating space 111 and connects to the float 15. The strain atm 13 has bending elasticity in the longitudinal direction so that the float 15 may move with rising and lowering of the fluid 15. In detailed description, a horizontal reference line L is marked on the container 11, and when the liquid surface of the fluid W aligns with the horizontal reference line L, a part of the float 15 may immerse in the fluid W and the buoyant force applied to the float 15 equals to the weight of the float 15, so that the strain arm 13 remains horizontally unbent. However, when the liquid surface of the fluid W rises and the buoyant force applied to the float 15 increases, the float 15 will move upwardly with the liquid surface according to the buoyant force and the strain arm 13 will bend upwardly. On the contrary, when the liquid surface of the fluid W falls and the buoyant force applied to the float 15 decreases, the float 15 will move downwardly with the liquid surface the strain arm 13 will bend downwardly because the buoyant force is smaller than the weight of the float 15.

Accordingly, for detecting the bending deformation of the strain arm 13, a measuring portion 211 is disposed on a portion of the optical fiber 21, which corresponds to the strain arm 13. The measuring portion 211 is connected to the strain arm 13 and extends between the fixed end 131 and the free end 133 of the strain arm 13 in the longitudinal direction. Herein, the fiber 21 couples to the optical module 23, and the signal processing module 25 couples to the optical module 23. Whereby, the optical module 23 may emit an input signal into the optical fiber 21, an output signal is generated and transmitted to the optical module 23 after the input signal is processed by the measuring portion 211, and the output signal is then analyzed by the signal processing module 25.

In detailed description, a grating is forming at the measuring portion 211, when the strain arm 13 bends and deforms, the measuring portion 211 will also bend and deform and further induce changes in the grid line spacing of the grating while the wavelength of the light signal will drift. Therefore, the deformation of the strain arm 13 may be known by monitoring the wavelength changes of the output signal.

Figure 2:
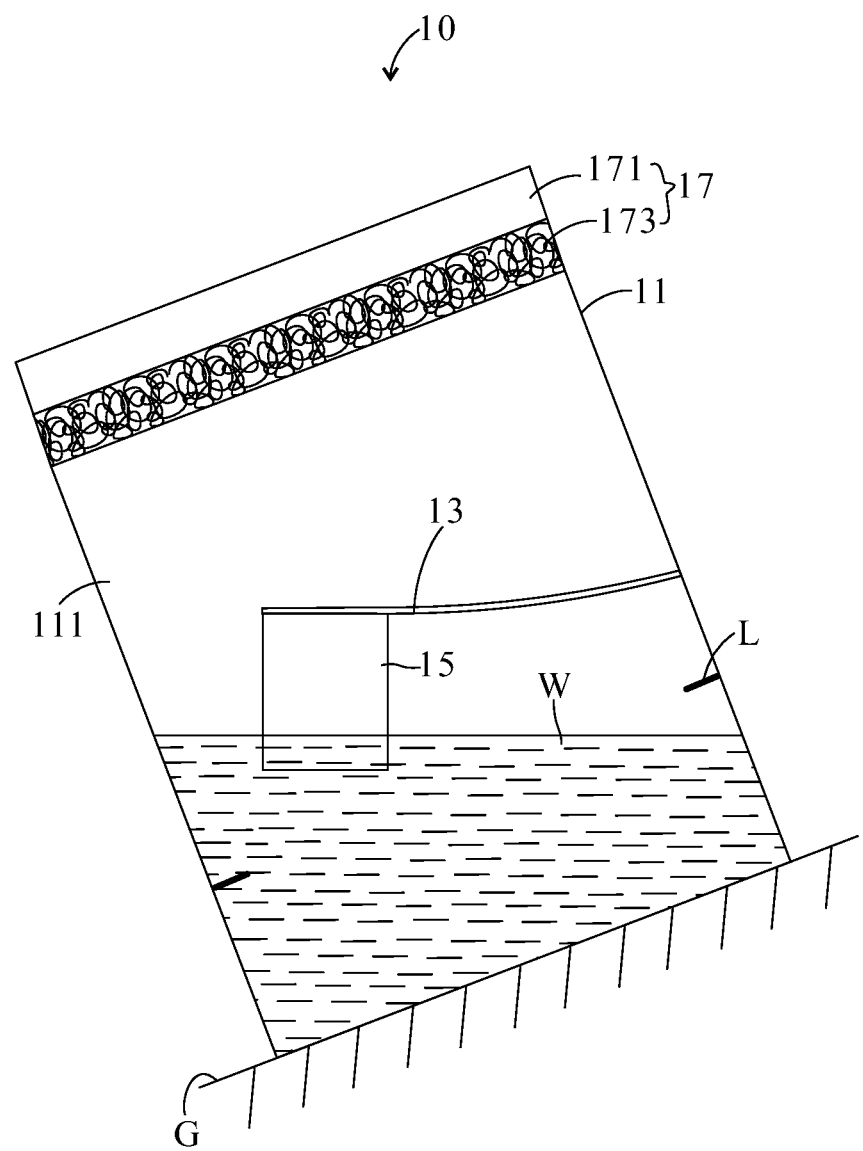
FIG. 2 is a perspective view of the sensing system which is detecting a inclination of one embodiment of the present invention.

Furthermore, as illustrated in FIG. 2, the tested unit 10 of the present invention preferably comprises a water vapor adsorption plate 17 for cap sealing the container 11 so that the accommodating space 111 of the container 11 becomes a confined space to prevent dropping of the liquid level caused by evaporation of the fluid W. With detailed descriptions, the water vapor adsorption plate 17 of the present embodiment includes a cover 171 and a cotton layer 173, wherein the cover 171 cap sealing the container 11, and the cotton layer 173 is fixed to the inner side of the cover 171 and absorbing saturating amount of water to slow down the evaporation rate of the fluid W.

Figure 3:
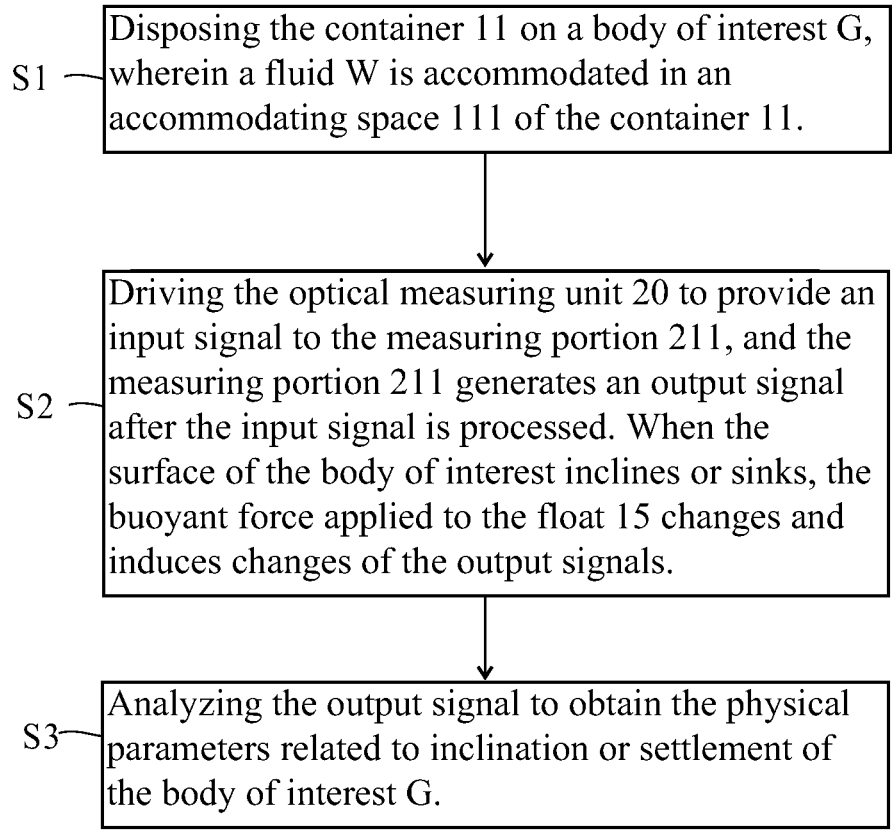
FIG. 3 is a flowchart of the sensing method of one embodiment of the present invention.

Accordingly, the sensing system 100 of the present embodiment may be applied to measure the inclination or settlement of a body of interest, such as bridges, buildings, or roads. Please refer to FIG. 3, which illustrates a flowchart of the sensing method of the present embodiment. Please refer to the perspective views of the sensing system 100 illustrated in FIG. 1 and the inclination of the sensing system 100 illustrated in FIG. 2 with the following descriptions.

Step S1: disposing the container 11 on a body of interest G, wherein a fluid W is accommodated in an accommodating space 111 of the container 11. Herein, the container 11 is horizontally disposed on the body of interest G, and the liquid surface of the fluid W (such as water or other liquids) aligns to the horizontal reference line, so that the buoyant force applied to the float 15 equals to the weight of the float 15 and the strain arm 13 is horizontally unbent as the initial state (as illustrated in FIG. 1).

Step S2: driving the optical measuring unit 20 to provide an input signal to the measuring portion 211, and the measuring portion 211 generates an output signal after the input signal is processed. When the surface of the body of interest inclines or sinks, the buoyant force applied to the float 15 changes and induces changes of the output signals. FIG. 2 shows an exemplary illustration of the inclination. When the surface of the body of interest G inclines toward the left, the container will incline toward the left along with body of interest G and the fluid W will move toward the left to maintain the liquid level so that the strain arm 13 will bend upwardly due to the increasing buoyant force applied to the float 15. In the meantime, the measuring portion 211 (not shown in FIG. 2, please refer to FIG. 1) connected to the strain arm 13 bends with the strain atm 13 and induces changes in the grid line spacing of the grating. Further, the reflective light signal (ie. the output signal) received by the optical module (not shown in FIG. 2, please refer to FIG. 1) may also change.

Step S3: analyzing the output signal to obtain the physical parameters related to inclination or settlement of the body of interest G. In detail, different inclination/settlement levels of the body of interest G may cause different bending deformation levels of the strain arm 13, and the output signal will relate to the inclination/settlement levels. Therefore, the value measured in an initial state has served as a standard for evaluating the inclination/settlement, and the output signal is then converted into the relevant inclining angle or sinking depth by the signal processing module 25 (not shown in FIG. 2, please refer to FIG. 1) to realize the inclination/settlement of the body of interest G.

Figure 4:
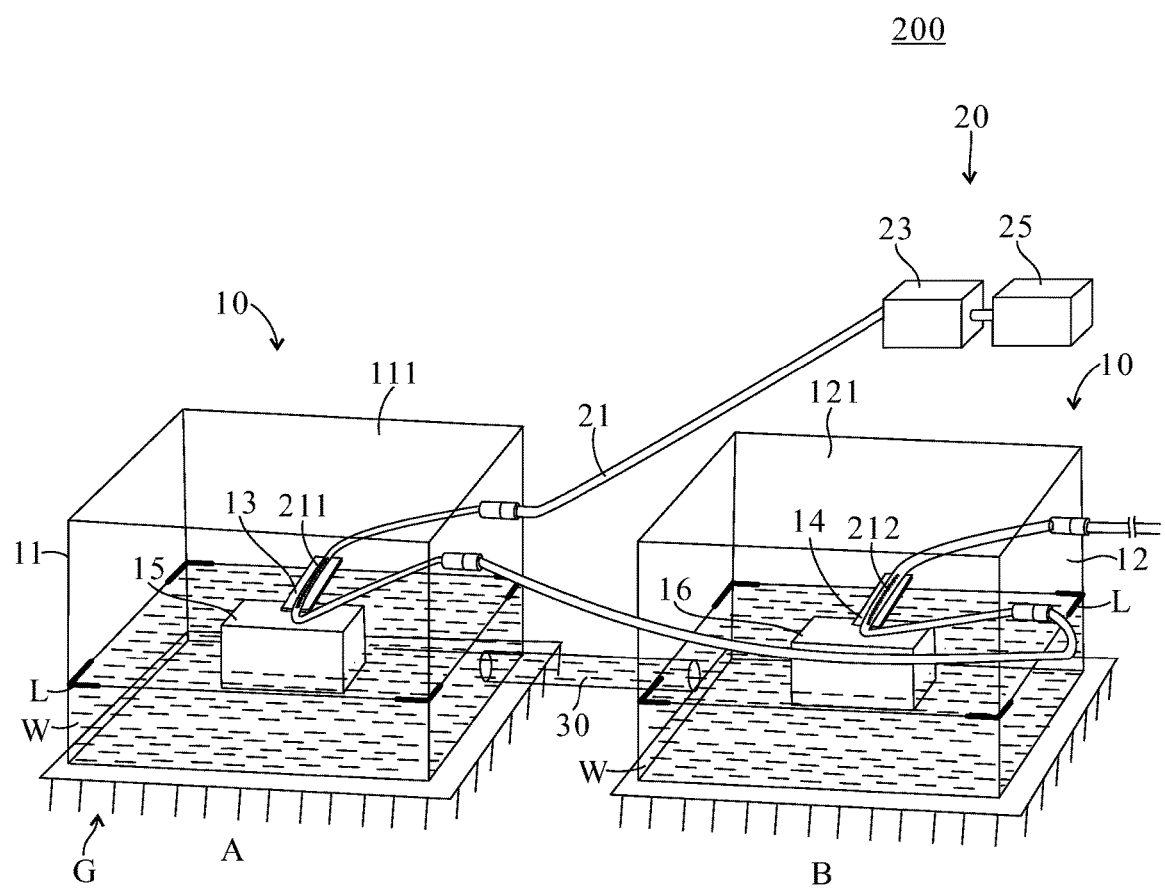
FIG. 4 is a perspective view of the sensing system of another embodiment of the present invention.

Also, please refer to FIG. 4, which illustrates a perspective view of a sensing system 200 of another embodiment of the present invention. The difference between the sensing system 200 of the present embodiment and the aforementioned sensing system 100 is that the sensing system 200 includes a plurality of tested units 10, and a connecting tube 30 is disposed between the tested units 10 for connecting the accommodating spaces 111, 121 of the containers 11, 12, so that the liquid levels of the fluid W in the accommodating space 111, 121 may be maintained at the same level based on connected pipes principle. The optical fiber 21 of the optical fiber measuring unit 20 includes a plurality of measuring portions 211, 212 to connect with the corresponding strain arms 13, 14 respectively. Herein, the present embodiment is exemplified with two tested units 10 and one connecting tube 30. As illustrated in FIG. 4, the surfaces of the fluid W in both of the tested units 10 aligns to the horizontal reference line L of the containers 11, 12, and the strain arms 13, 14 remain horizontally unbent when the surfaces of interest A, B of the body of interest G were at the same liquid level.

Figure 5:
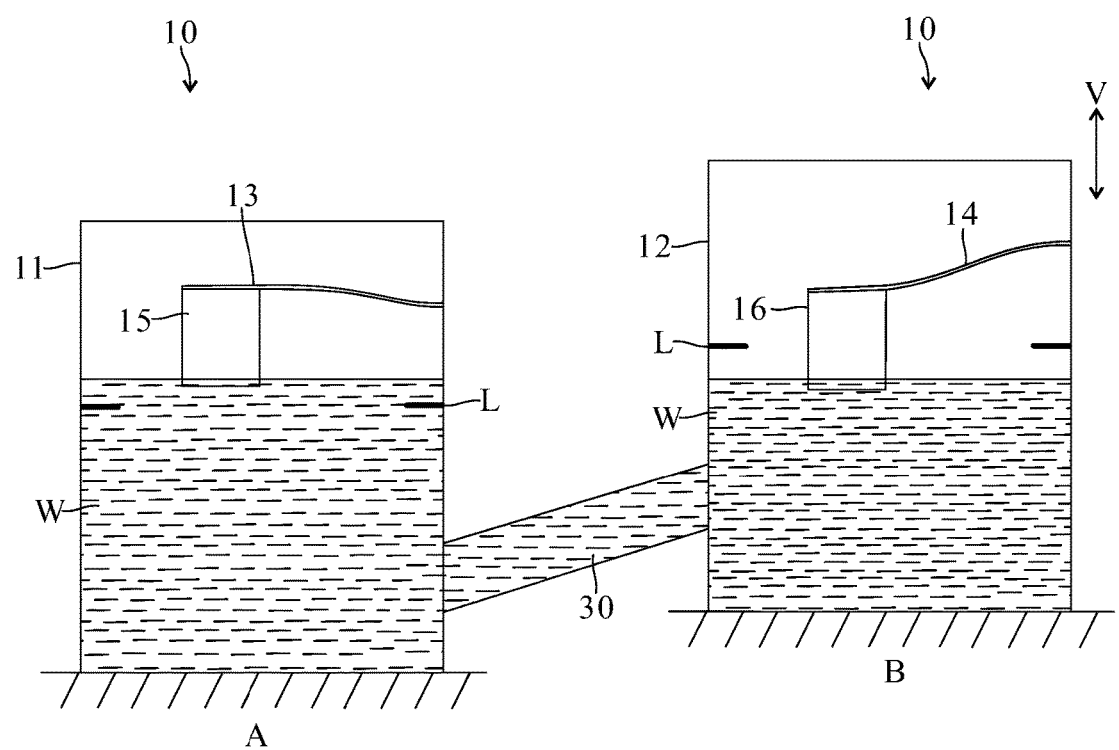
FIG. 5 is a perspective view of the sensing system which is detecting a settlement of another embodiment of the present invention.

Next, please refer to FIG. 5 for further descriptions of the mechanism when the containers 11, 12 shift relatively in the vertical direction V. As shown in FIG. 5, when the surface of interest A sinks, the fluid Win the container 12 disposed on the surface of interest B will flow into the container 11 disposed on the surface of interest A based on connecting pipe principle for maintaining the surfaces of the fluid W in two containers 11, 12 in the same liquid level. At the meantime, the liquid surface of the fluid W in the container 11 rises and exceeds the horizontal reference line L, the buoyant force applied to the float 15 increases and push the float 15 to move upwardly, and the strain arm 13 is driven to bend upwardly. The liquid surface of the fluid W in the container 12 drops below the horizontal reference line L, the buoyant force applied to the float 16 decreases and forces the float 16 to move downwardly, and the strain arm 14 is driven to bend downwardly. Accordingly, the bending deformation of the strain arms 13, 14 will induce the change of the grid line spacing of the grating of the measuring portion 211, 212 (not shown in FIG. 5, please refer to FIG. 4), and further changes the reflected light signal (that is, the output signal) received by the optical module 23 (not shown in FIG. 5, please refer to FIG. 4). The measured output signals are relevant to the relative displacement of the containers 11, and 12; therefore, the surface settlement condition of the body of interest G may be realized by converting the output signals into the displacement value through the signal processing module 25 (not shown in FIG. 5, please refer to FIG. 4).

The number of the tested unit 10 used in practices is not limited to the number disclosed in the present embodiment, N tested units 10 and N−1 connecting tubes 30 (N≥2) may be used as needed, and two ends of each connecting tubes 30 connect to the container 11 of different tested units 10.

Figure 6:
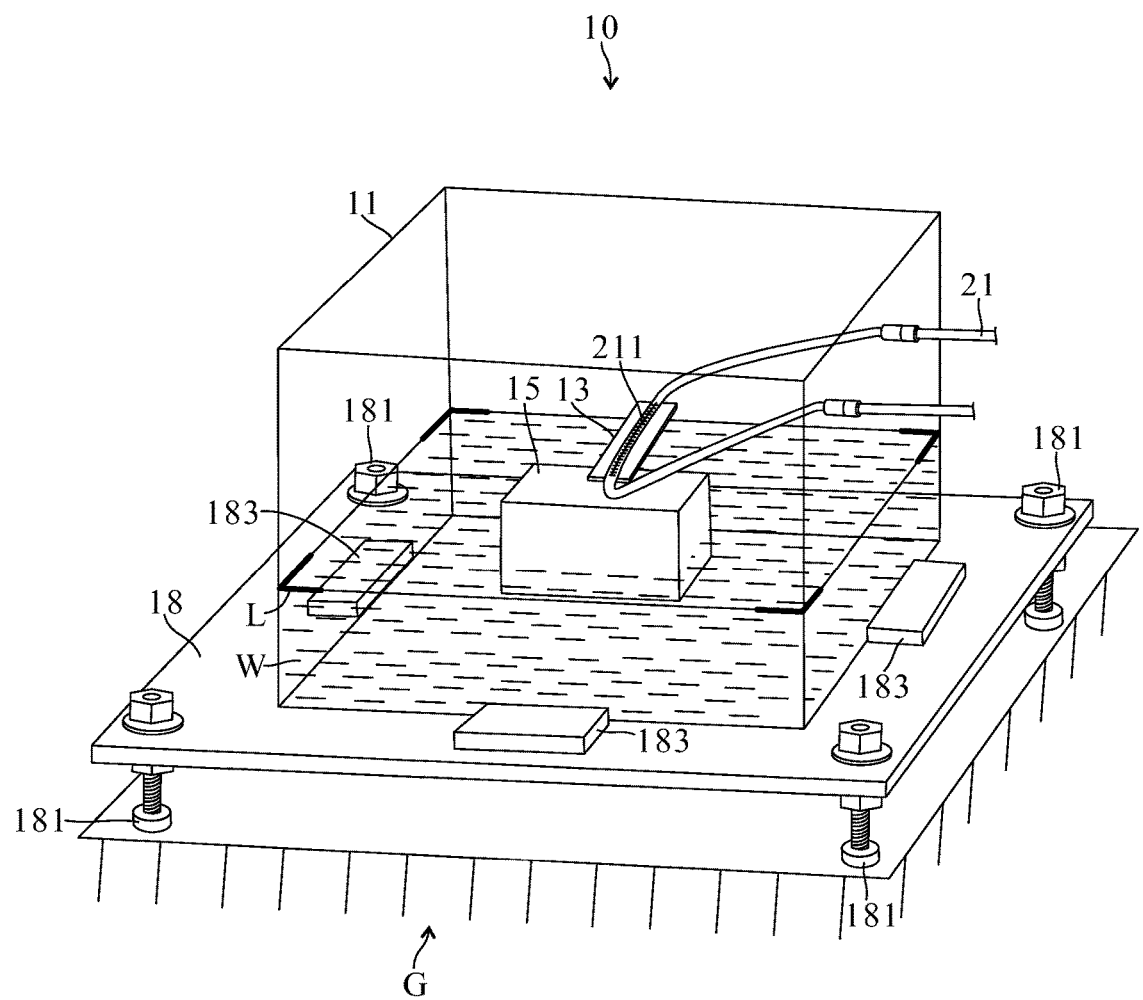
FIG. 6 is a perspective view of the tested unit of another embodiment of the present invention.

Further, please refer to FIG. 6, the tested unit 10 further comprises an adjustable platform 18 to make sure that the tested unit 10 is in its initial state. The container 11 is horizontally disposed on the body of interest G, wherein the liquid surface of the fluid W in the container 11 is aligned with the horizontal reference line L and the strain arm 13 is horizontally unbent. In detailed, the adjustable platform 18 includes an adjustment assembly 181, which may be used for adjusting the horizontally of disposing surface of the container 11, so that the container 11 may exhibit the horizontal initial state for preventing the non-horizontally conditions due to the uneven surfaces of the body of interest G. The adjustment assembly 181 of the present embodiment is exemplified as four adjusting screws that disposed at four corners of the adjustable platform 18. Alternatively, the adjustable platform 18 may further include a defining structure 183 for defining a disposing region corresponding to the edges of the container 11, so that the container 11 may be fixed at the disposing region when the container 11 is disposed on the adjustable platform 18 for preventing the displacement of the container 11 on the adjustable platform 18. The defining structure 183 is not particularly limited as long as it is capable of preventing the displacement of the container 11. For example, the defining structure 183 may be formed as a convex component or a groove on the surface of the adjustable platform 18. Herein, the defining structure 183 is exemplified as convex barriers in the present embodiment.

Although the present invention has been explained in relation to its preferred embodiment, it is to be understood that many other possible modifications and variations can be made without departing from the spirit and scope of the invention as hereinafter claimed.

What is claimed is:

1. A sensing system, including:
    at least one tested unit comprising a container, a strain arm, and a float, wherein an accommodating space is defined in the container for accommodating a fluid, the strain arm has a fixed end and a free end, wherein the fixed end of the strain arm connects to a side wall of the container, and the free end of the strain arm overhangs in the accommodating space and connects to the float, the float shifts by changes of buoyant force and induce a bending deformation of the strain arm; and
    an optical fiber measuring unit having at least one measuring portion, wherein the measuring portion combines with the strain arm and extends between the fixed end and the free end for detecting the bending deformation of the strain arm.

2. The sensing system as claimed in claim 1, wherein a grating is formed at the measuring portion, and the bending deformation of the strain arm induces changes of grid line spacing of the grating.

3. The sensing system as claimed in claim 1, wherein the sensing system detects surface inclination or settlement of a body of interest and physical parameters relate to surface inclination or settlement of the body of interest is determined by detecting the bending deformation of the strain arm using the measuring portion.

4. The sensing system as claimed in claim 1, wherein the tested unit further comprises an adjustable platform for disposing the container thereon and adjusting a horizontality of the body of interest when the container is disposed on the body of interest.

5. The sensing system as claimed in claim 4, wherein the adjustable platform further comprises a defining structure for defining a disposing region, so that the container is fixed at the disposing region when the container is disposed on the adjustable platform.

6. The sensing system as claimed in claim 1, wherein a horizontal reference line is marked on the container, the strain arm remains horizontally unbent when the liquid level of the fluid aligns to the horizontal reference line.

7. The sensing system as claimed in claim 1, wherein the optical fiber measuring unit comprises an optical fiber, an optical module, and a signal processing module, wherein the measuring portion is disposed on a portion of the optical fiber where corresponds to the strain arm; the optical module is utilized to transmit an input signal to the optical fiber, and the measuring portion generates an output signal which is transmitted to the optical module after the input signal is processed, and the signal processing module is utilized to obtain a physical parameter by analyzing the output signal.

8. The sensing system as claimed in claim 1, wherein the buoyant force applied to the float changes when the container inclines and the deformation level of the strain arm relates to the incline angle of the container.

9. The sensing system as claimed in claim 8, wherein the tested unit further comprises a water vapor adsorption plate for cap sealing the container and adsorbing saturating amount of water.

10. The sensing system as claimed in claim 1, wherein the tested unit includes a plurality of the tested unit; and at least one connecting tube for connecting the accommodating spaces of the containers, so that the liquid levels of the fluid in the accommodating spaces maintain at a same level based on connected pipes principle.

11. The sensing system as claimed in claim 10, wherein the buoyant force applied to the float changes when the container shifts relatively in a vertical direction, and a level of the bending deformation of the strain arm relates to a relevant displacement between the containers.

12. A sensing method using the sensing system as claimed in claim 1, comprising the steps of:
    disposing the container on the body of interest, and the fluid is accommodated in the accommodating space of the container;
    driving the optical fiber measuring unit to provide an input signal to the measuring portion, and the measuring portion generates an output signal after the input signal is processed, when the surface of the body of interest occurs inclination or settlement, the buoyant force applied to the float changes, and changes the output signal; and
    analyzing the output signal to obtain the physical parameters relevant to inclination or settlement of the body of interest.

13. The sensing method as claimed in claim 12, wherein the container is horizontally disposed on the body of interest, and the buoyant force provided by the fluid equals to the weight of the float, so that the strain arm exhibit a horizontally unbent initial state, and a measured value corresponds to the initial state serves as an initial point for evaluating whether inclination or settlement of the body of interest occurs.

* * * * *